April 19, 1927. B. H. DARROW Re. 16,597

TUB

Original Filed Sept. 14, 1925 2 Sheets-Sheet 1

INVENTOR.
Benjamin H. Darrow
BY Fay, Oberlint & Fay
ATTORNEYS.

April 19, 1927. B. H. DARROW Re. 16,597

TUB

Original Filed Sept. 14, 1925 2 Sheets-Sheet 2

INVENTOR.
Benjamin H. Darrow
BY
Fay, Oberlin & Fay
ATTORNEYS.

Reissued Apr. 19, 1927. Re. 16,597

UNITED STATES PATENT OFFICE.

BENJAMIN HARRISON DARROW, OF WOODSTOCK, OHIO, ASSIGNOR TO THE SANI-TABL-TUB COMPANY, OF ALLIANCE, OHIO, A CORPORATION OF OHIO.

TUB.

Original No. 1,590,738, dated June 29, 1926, Serial No. 56,223, filed September 14, 1925. Application for reissue filed January 3, 1927. Serial No. 158,776.

My present invention relates to a portable bathtub for use in homes where running water is not available.

The principal object of my invention is the provision of a tub of the type described which may be used both as a laundry and a bathtub, and which may be turned or pulled over onto its side and utilized as a table.

To this end my invention comprises a tub having two end walls joined on one longitudinal side by a third wall, the fourth side remaining open. Included between the end walls I provide a tub of less depth than the end and longitudinal wall, of less width than the end walls, but of the full length of the longitudinal wall. Adjacent one longitudinal edge of the tub proper, I provide a seat included between the end walls, and which in connection with the tub proper, practically closes that side of the tub structure. Upon turning the structure upon its side opposite the longitudinal side, the latter becomes a table by reason of the fact that it is substantially flat. That portion of the device opposite the tub proper is left open and makes room for the feet of persons using the device as a table.

The invention further consists in the particular construction, arrangement, and combination of parts hereinafter shown and described.

I have illustrated in the accompanying drawings one form of the invention, although obviously I do not wish to be limited thereto, as the embodiment shown merely illustrates the principle involved.

In the drawings:—

In these drawings the end walls are shown at 3 preferably of porcelain because of its beauty and ease of keeping clean, yet obviously any desired material may be used.

Between these ends walls is included the tub proper as by spot welding, or otherwise as desired. From an inspection of Fig. 6 it will be noted that the tub is of less width and depth than the end walls.

Adjacent one longitudinal edge of the tub 5 I provide a narrow strip or side 4 also secured between the end walls 3. Such side may be conveniently used as a bath seat when the tub is being utilized.

Figure 1:
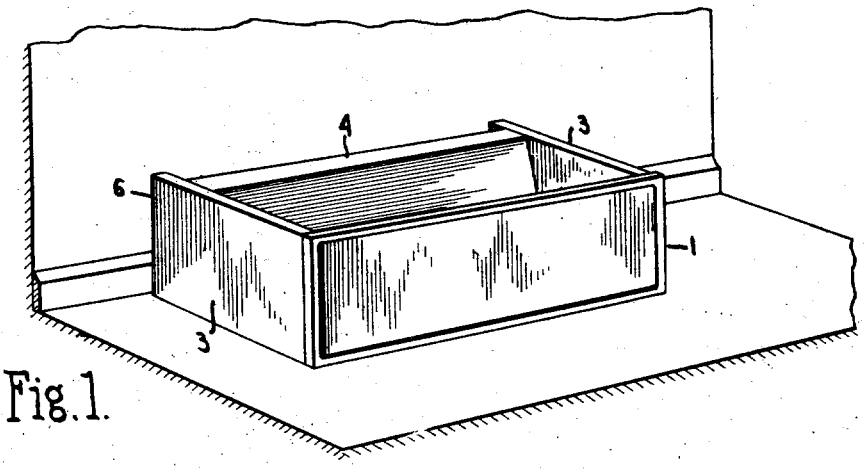
Figure 1 is a perspective view of one embodiment of my invention.
Figure 2:
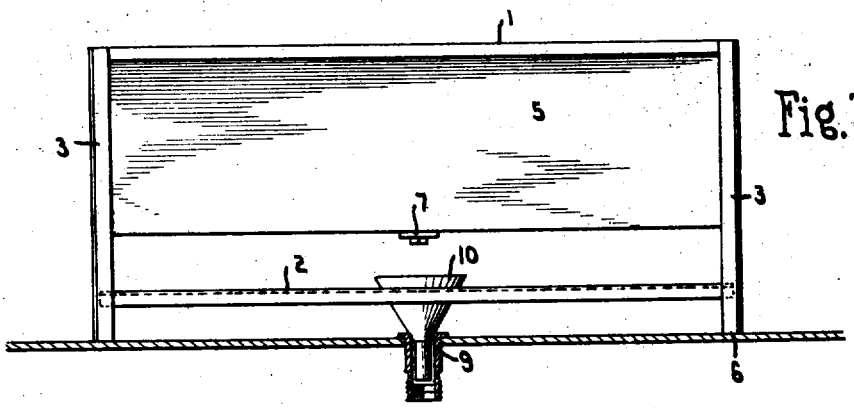
Figure 2 is a rear elevation.
Figure 3:
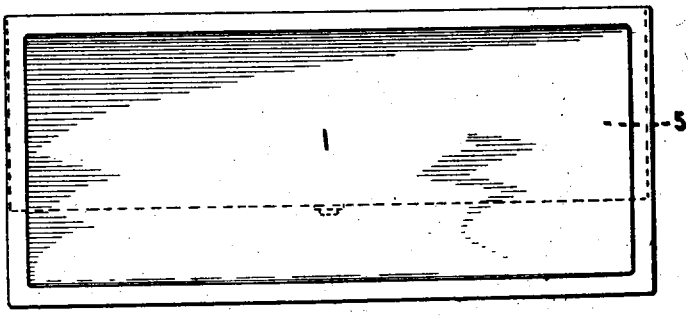
Fig. 3 is a top plan view.
Figure 4:
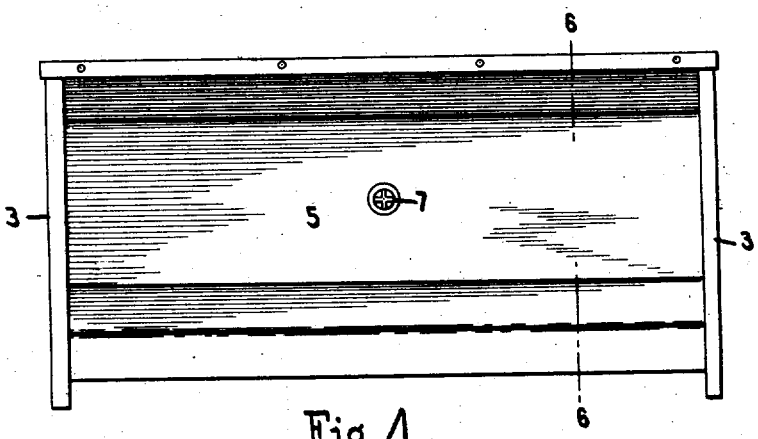
Fig. 4 is a front elevation.
Figure 5:
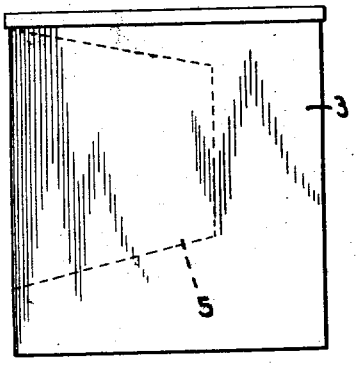
Fig. 5 is an end elevation.
Figure 6:
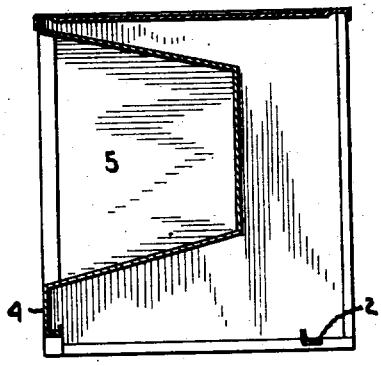
Fig. 6 is a sectional view along line 6—6 of Fig. 3.
Figure 7:
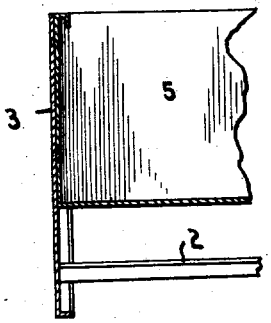
Fig. 7 is a detail of one corner of the device.

A substantially flat longitudinal side is shown at 1, preferably of the same material, and lies adjacent the tub proper, as shown in Fig. 6. This long side is adapted to be used as a table when the device is turned over and rests upon the edges 6 of the end walls 3.

An L-iron or brace is shown at 2 which serves to more rigidly connect the end walls and lend strength to the structure.

It is to be noted that when the device is being used as a table, the two longitudinal sides of the device are substantially open to accommodate the feet of persons using the same.

The tub proper may be provided with a drainage outlet 7 normally closed by a stopper, not shown.

In order to empty the tub I provide a drainage outlet as at 9 in the floor of the room where the device is to be used, into which a funnel 10 is placed, the tub itself being moved until the aperture 7 is over the flaring end of the funnel 10. The plug may then be removed and the water contained in the tub will drain through the outlet 9.

It will be obvious that I have provided a portable device which may be readily used as a wash tub or bathtub in localities where running water is not available, and which at the same time, may be used as a table by merely changing the position of the device itself. By making the device of porcelain or similar material, it may be readily kept clean both inside and out, and presents an attractive appearance.

Having thus described my invention, what I claim is:

1. A bathtub comprising two end walls, a longitudinal side wall secured thereto, the adjacent longitudinal side wall being closed by a tub of less width and depth than the width of the longitudinal wall, but of its full length, the remaining two sides of the device remaining open, that side of the device closed by the tub having a longitudinal seat adjacent the tub, the longitudinal side wall occupying a horizontal position so as to be used as a table top when the device is resting on its opposite side.

2. A portable table tub structure comprising two end walls, a longitudinal flat side wall constituting a table top secured thereto, a tub included between the end walls, one longitudinal edge of the tub being adjacent one longitudinal edge of the table top, and a seat portion adjacent to the opposite longitudinal edge of the tub, the table top occupying a horizontal position when the device rests on its opposite side.

3. A portable table tub structure comprising two end walls, a longitudinal flat side wall constituting a table top secured thereto, a tub included between the said end walls, and one longitudinal edge of said tub being closely adjacent to one edge of said table top, whereby said structure may be converted from a table into a tub by being given a quarter turn from its original table position.

4. A portable table tub structure comprising two end walls, a longitudinal side wall constituting a table top secured thereto, a tub secured to said end walls and having its open side lying in a plane 90 degrees from the plane of said longitudinal table top, whereby said structure may be converted from a table into a tub by being turned through an angle of 90 degrees.

5. A portable table comprising two end walls, a longitudinal table top secured to said end walls with a tub included between the end walls, and a seat adjacent to one edge of said tub.

6. A portable table tub structure comprising two end walls, a longitudinal flat side wall constituting a table top secured to said end walls, a tub of less width and depth than the width of said table top, said tub being secured between said two end walls and having its open side lying in a plane 90 degrees from the plane of the table top.

Signed by me, this 31st of December, 1926.

BENJAMIN HARRISON DARROW.